United States Patent [19]
Krihak et al.

[11] Patent Number: 5,985,568
[45] Date of Patent: *Nov. 16, 1999

[54] METHOD OF PHOTOELECTRO-MANIPULATION OF TARGET MOLECULES AND APPARATUS THEREFOR

[75] Inventors: Michael Krihak, Phoenix; Chan-Long Shieh, Paradise Valley, both of Ariz.

[73] Assignee: Motorola, Inc., Schaumburg, Ill.

[ * ] Notice: This patent is subject to a terminal disclaimer.

[21] Appl. No.: 08/923,837

[22] Filed: Sep. 4, 1997

[51] Int. Cl.$^6$ .............................. C12Q 1/68; C07H 21/04; C25D 5/00
[52] U.S. Cl. ........................ 435/6; 435/91.1; 536/23.1; 536/24.3; 205/91; 205/92
[58] Field of Search ......................... 435/6, 91.1, 287.2; 436/94; 536/23.1, 24.3, 24.33, 25.1; 205/91, 92, 118, 122

[56] References Cited

U.S. PATENT DOCUMENTS

| | | | |
|---|---|---|---|
| 5,489,988 | 2/1996 | Ackley et al. | 356/436 |
| 5,605,662 | 2/1997 | Heller et al. | 422/68.1 |
| 5,671,303 | 9/1997 | Shieh et al. | 385/12 |
| 5,723,320 | 3/1998 | Dehlinger | 435/91.1 |
| 5,733,509 | 3/1998 | Ackley et al. | 422/131 |
| 5,759,779 | 6/1998 | Dehlinger | 435/6 |
| 5,810,989 | 9/1998 | Krihak et al. | 205/91 |

*Primary Examiner*—Eggerton A. Campbell
*Assistant Examiner*—Jeffrey Siew
*Attorney, Agent, or Firm*—Eugene A. Parsons; William E. Koch

[57] ABSTRACT

A method of photoelectro-manipulation of target molecules including providing a photoconductive layer of material having a first and a second electrically conductive contact on a first surface thereof and a probe on an opposed second surface. A solution containing target molecules is positioned in electrical contact with the probe. A positive potential is connected between the solution and the first electrically conductive contact and a negative potential is connected between the solution and the second electrically conductive contact. A beam of light is directed through a portion of the photoconductive layer of material to complete an electrical circuit between one of the first and the second electrically conductive contacts and the solution, whereby target molecules in the solution are attracted to or repelled from the probe which is coupled into the electrical circuit by the beam of light.

20 Claims, 1 Drawing Sheet

METHOD OF PHOTOELECTRO-MANIPULATION OF TARGET MOLECULES AND APPARATUS THEREFOR

BACKGROUND OF THE INVENTION

1. Field of the Invention

This invention relates to analysis of molecular samples.

More particularly, the present invention relates to manipulation of molecules through the use of electric fields.

2. Prior Art

Identification of molecular structure has become very important in many industries. In particular, biological molecules such as nucleic acids and proteins are analyzed to form the basis of clinical diagnostic assays. The procedures utilized often involved large numbers of repetitive steps which consume large amounts of time. With the advent of large projects such as the human genome project, faster and less complex techniques were required.

Simpler and quicker analysis of molecules has been provided by the development of devices including a monolithic array of test sites formed on a substrate. Each site includes probes therein to bond with predetermined target molecules from samples applied to the device. The binding of a molecule to a probe is noted, and that molecule is identified. There are many techniques for determining which test sites have molecules bonded to them including autoradiography, optical detection and electronic detection. The use of monolithic devices with an array of test sites provides a procedure which permits the testing of a great many samples quickly. However, there are numerous problems with the use of these devices which increase complexity and decrease accuracy.

For example, nucleic acid hybridization analysis is a procedure wherein target DNA or RNA strands bond to probes which are typically oligonucleotide sequences. The analysis generally involves detecting very small numbers of a specific target nucleic acid sequence among a large number of non-target sequences. Thus, the concentration of target molecules proximating the appropriate test site is unfavorable. Furthermore, when a sample is composed of a large number of sequences, partial hybridization of similar sequences can occur. These problems lead to a loss in sensitivity and accuracy during analysis.

These problems have generally been overcome by free field electrophoresis and the use of addressable matrices. Molecules in a sample can be transported by free field electrophoresis to any specific test site where the molecules are concentrated. The sensitivity for detecting a specific molecular structure is enhanced because of the increase in concentration of molecules available for binding to the site. Any unbound molecules can be removed by reversing the polarity at the site. Furthermore, in nucleic acid hybridizations, partial hybridizations, which form a much weaker bond than the full hybridization, can be severed by the reverse polarization at specific sites. Thus, accuracy and sensitivity are greatly increased.

The problem is that for each test site of the matrix to be addressable, electrodes and leads must be provided for each test site. As device size shrinks and the number of test sites increases, the complexity and expense of forming devices with a plurality of isolated electrodes and associated leads also increases. While large numbers of electrodes and micro-electrodes can be easily formed, addressably contacting each with the use of leads becomes increasingly complex and expensive as the number of electrodes increases.

It would be highly advantageous, therefore, to remedy the foregoing and other deficiencies inherent in the prior art.

Accordingly, it is an object of the present invention to provide a new and improved method and apparatus for manipulating molecules.

Another object of the present invention is to provide a method and apparatus for manipulating molecules using wireless contacts for a spatially addressable array of electrodes.

And another object of the present invention is to provide a method and apparatus for analyzing molecules which is fast and efficient.

Still another object of the present invention is to provide a method and apparatus which can include large probe arrays.

Yet another object of the present invention is to provide a method and apparatus which can selectively apply a positive or negative potential or combinations of both.

SUMMARY OF THE INVENTION

Briefly, to achieve the desired objects of the instant invention, in accordance with a preferred embodiment thereof, provided is a method of photoelectro-manipulation of target molecules including the steps of providing a photoconductive layer of material having a first and a second electrically conductive contact on a first surface thereof. Providing a probe on an opposed second surface of the photoconductive layer and positioning a solution containing the target molecules in electrical contact with the probe. Connecting a positive potential between the solution and the first electrically conductive contact and connecting a negative potential between the solution and the second electrically conductive contact. Directing a beam of light through a portion of the photoconductive layer of material to complete an electrical circuit between one of the first and the second electrically conductive contacts and the solution through the portion of the photoconductive layer, whereby target molecules in the solution are attracted to or repelled from the probe, respectively, which is coupled into the electrical circuit by the beam of light.

Also provided is photoelectro-manipulation apparatus for the manipulation of target molecules. The apparatus includes a photoconductive layer of material having a first electrically conductive contact strip and a second electrically conductive contact strip on a first surface thereof, formed of transparent conductive material. A plurality of probes on an opposed second surface of the photoconductive layer, the plurality of probes being formed on a plurality of micro-locations, each micro-location overlying the first electrically conductive contact strip and the second electrically conductive contact strip and having probes with identical sequences, the sequences differing between micro-locations. A positive electrical terminal coupled to the first electrically conductive contact strip and a negative electrical terminal coupled to the second electrically conductive contact strip.

BRIEF DESCRIPTION OF THE DRAWING

The foregoing and further and more specific objects and advantages of the instant invention will become readily apparent to those skilled in the art from the following detailed description of the preferred embodiment thereof taken in conjunction with the drawing in which.

DETAILED DESCRIPTION OF THE PREFERRED EMBODIMENT

Figure 1:
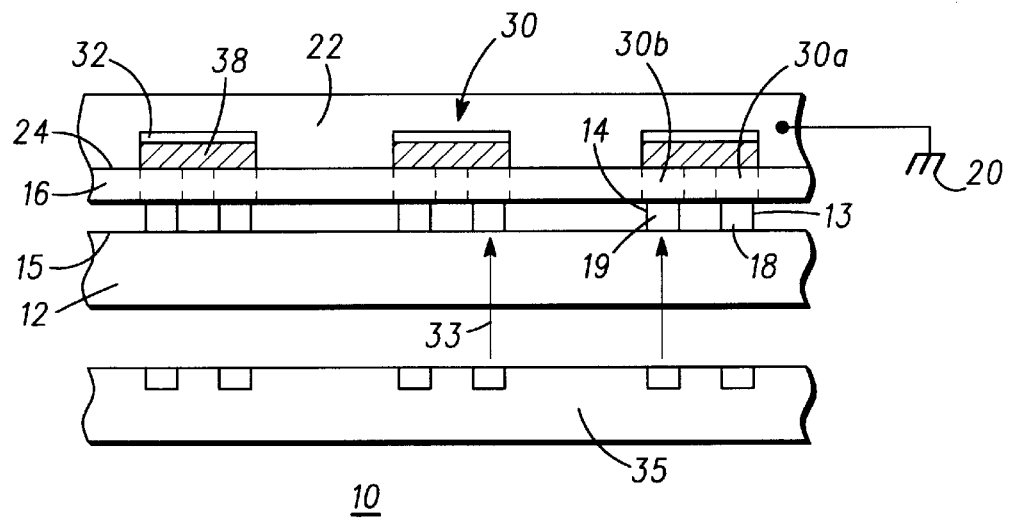
FIG. 1 is a sectional view of a photoelectro-manipulation apparatus according to the present invention.

Turning now to the drawings in which like reference characters indicate corresponding elements throughout the several views, attention is first directed to FIG. 1 which illustrates a photoelectro-manipulation apparatus generally designated 10. Photoelectro-manipulation apparatus 10 includes a transparent substrate 12 preferably fabricated of glass, plastic, etc., an electrically conductive contact strip 13 and an electrically conductive contact strip 14 on a surface 15 of substrate 12, and a photoconductive layer 16 formed on contact strips 13 and 14. Contact strips 13 and 14 are generally parallel and formed of indium tin oxide (ITO), conductive polymers, or other optically transparent conductors for reasons which will become apparent from the subsequent description. It will be understood that when the term transparent is used throughout the text, it refers to a material's ability to pass through light being used to transform photoconductive layer 16. Multiple parallel contact strips 13 and 14 can be formed on substrate 12, as illustrated. Photoconductive layer 16 is a material such as amorphous silicon, amorphous SiGe, amorphous SiC, CdS, CdSe, photoconductive polymers, etc., which becomes conductive when subjected to light.

Still referring to FIG. 1, leads 18 and 19 are coupled to contact strips 13 and 14, respectively, and a lead 20 is coupled to ground and to a solution 22 positioned in electrical contact with a surface 24 of photoconductive layer 16 opposite to contact strips 13 and 14. While not specifically shown, it will be understood that solution 22 is in electrical contact only with surface 24 and not with contact strips 13 and 14. A positive potential is applied between solution 22 and electrically conductive contact strip 13 and a negative potential is applied between solution 22 and electrically conductive contact strip 14.

Figure 2:
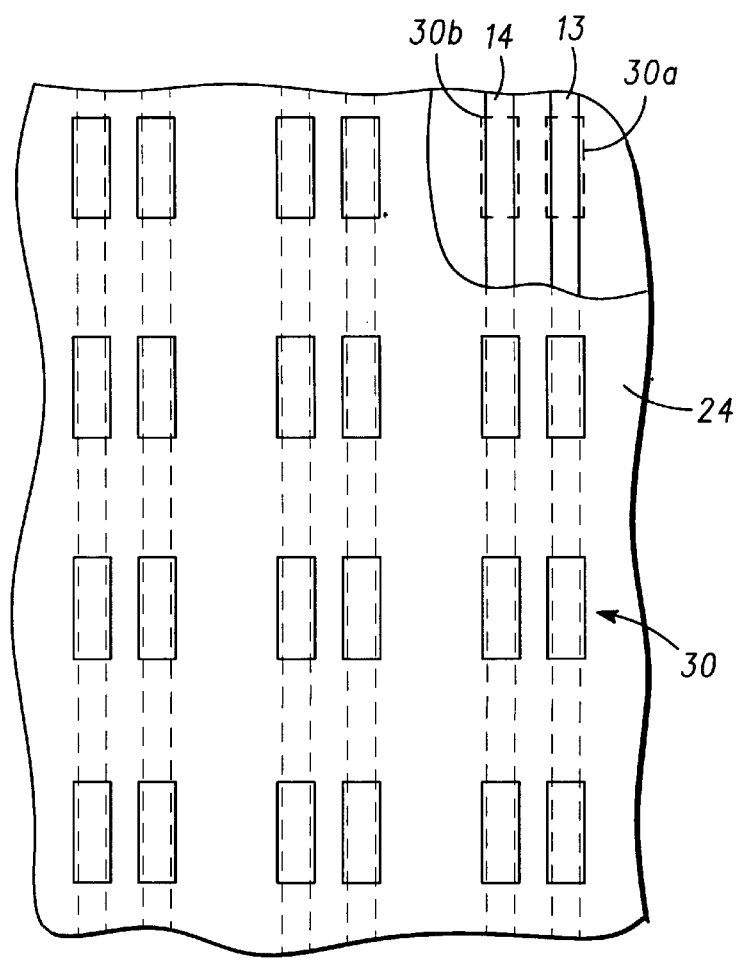
FIG. 2 is a fragmentary top view illustrating the layout of the first and second conductive strips.

With additional reference to FIG. 2, an array of micro-locations 30 (test sites) are defined on surface 24 of photoconductive layer 16. Each micro-location 30 has a portion 30a overlying electrically conductive contact strip 13 and a portion 30b overlying electrically conductive contact strip 14. While a plurality of micro-locations are illustrated overlying a plurality of pairs of contact strips 13 and 14, it will be understood that a single pair of contact strips 13 and 14 can be employed.

Referring back to FIG. 1, surface 24 is patterned with a plurality of electrically conductive pads 38 formed in the desired pattern or matrix of micro-locations 30. Groups 32 of probes are coupled to pads 38. Each micro-location 30 contains a plurality of probes which are capable of binding to specific molecular structures. The molecular structure can comprise, for example, biopolymers such as polynucleotides, DNA, RNA, cells, antibodies, etc. In the case of DNA or RNA testing, the probes can comprise, for example, oligonucleotides. All probes at a given micro-location 30 are identical, while probes in respective micro-locations differ in sequence for simultaneous detection of a plurality of different target molecules within a single array. Each micro-location 30 is individually addressable to provide the ability to repel ionic molecules from and attract ionic molecules to selected micro-location(s) 30.

A beam or beams of light 33 are directed through portions 30a or 30b of photoconductive layer 16 corresponding to a micro-location to complete an electrical circuit between one of conductive strips 13 and 14 and solution 22 through portion 30a or 30b of photoconductive layer 16. Since photoconductive layer 16 is directly overlying contact strips 13 and 14, illuminating photoconductive layer 16 at specific locations (portions 30a and 30b) will cause current to flow and thus, produce an electric field. By applying a positive bias, negatively charged species are attracted to a particular microlocation. Conversely, a negative bias will attract positively charged species. By completing the circuit, the ionic molecules (DNA, RNA, etc.) in solution 22 are attracted to and concentrate proximate surface 24 at a selected one or ones of micro-locations 30, or are repelled from selected one or ones of micro-locations 30. It will be understood that any method of controllably illuminating a selected portion of photoconductive layer 16 can be used, such as the use of an image light source 35 in which the pixels are aligned with contact strips 13 and 14. Image light source 35 can be a laser or diode array having a pair of light sources each forming a pixel for each micro-location or similar device instead of or in combination with a mask which permits passage of light in only the desired locations.

While light beams 33 are directed through substrate 12 in the preferred embodiment, it will be understood that light beams 33 can be directed through solution 22. In this latter instance, substrate 12 and contact strips 13 and 14 need not be formed of transparent material, but pads 38 must be. It is also contemplated that pads 38 can be omitted, with the probes coupled directly to photoconductive layer 16. However, the electric field generated will not be as uniformly distributed across micro-locations 30. By employing conductive pads 38, current will flow more evenly throughout the micro-location, generating a generally uniform electric field.

To enhance the manipulation of the ionic molecules within solution 22, a counter electrode or plurality of counter electrodes (not shown) can be positioned adjacent each micro-location 30. By opposing the potential of the micro-location with an opposite potential, enhanced manipulation is achieved. The counter electrodes used can be conventional electrodes with leads, but are preferably leadless, operated in the same manner as described for each micro-location above.

Thus provided is a new and improved method and apparatus for manipulating molecules using wireless contacts for a spatially addressable array of electrodes, which is fast and efficient, and which can include large probe arrays. Furthermore, the method and apparatus provided can selectively apply a positive or negative potential to each micro-location or combinations of both to an array.

Various modifications and changes to the embodiments herein chosen for purposes of illustration will readily occur to those skilled in the art. Other modifications and variations may be made by those skilled in the art without departing from the scope of the invention as defined by the following claims.

Having fully described and disclosed the present invention and preferred embodiments thereof in such clear and concise terms as to enable those skilled in the art to understand and practice same, the invention claimed is:

What is claimed is:

1. A method of photoelectro-manipulation of target molecules comprising the steps of:

providing a photoconductive layer of material having a first and a second electrically conductive contact on a first surface thereof;

providing a probe on an opposed second surface of the photoconductive layer;

positioning a solution containing the target molecules in electrical contact with the probe;

connecting a positive potential between the solution and the first electrically conductive contact and connecting a negative potential between the solution and the second electrically conductive contact, the step of connecting the positive potential and connecting the negative potential including the step of selectively applying of one of a positive or negative potential to one of the first and the second electrically conductive contacts and the solution; and directing a beam of light through a portion of the photoconductive layer of material to complete an electrical circuit between one of the first and the second electrically conductive contacts and the solution through the portion of the photoconductive layer, whereby target molecules in the solution are attracted to or repelled from the probe, respectively, which is coupled into the electrical circuit by the beam of light.

2. A method as claimed in claim 1 wherein each probe includes an oligonucleotide sequence, protein, antibody, enzyme, or cell.

3. A method as claimed in claim 1 wherein an electrically conductive pad is positioned between the probe and a portion of the photoconductive layer of material overlying the first and the second electrically conductive contacts.

4. A method as claimed in claim 1 wherein the step of providing the photoconductive layer of material includes providing a transparent substrate, depositing a transparent conductive material on the transparent substrate to form the first and the second transparent electrically conductive contacts and depositing the photoconductive layer on the first and the second electrically conductive contacts.

5. A method as claimed in claim 4 wherein the transparent conductive material includes indium tin oxide (ITO) or conductive polymers.

6. A method as claimed in claim 4 wherein the step of directing the beam of light includes directing the beam of light through the transparent substrate and one of the first and the second electrically conductive contacts.

7. A method as claimed in claim 6 wherein the step of directing the beam of light further includes providing a mask adjacent the transparent substrate.

8. A method as claimed in claim 1 wherein the photoconductive layer includes amorphous silicon, amorphous SiGe, amorphous SiC, CdS, CdSe, or photoconductive polymers.

9. A method of photoelectro-manipulation of target molecules comprising the steps of:

providing a photoconductive layer of material having a first electrically conductive contact strip and a second electrically conductive contact strip on a first surface thereof;

providing a plurality of probes on an opposed second surface of the photoconductive layer, the plurality of probes being formed on a plurality of micro-locations, each micro-location overlying the first electrically conductive contact strip and the second electrically conductive contact strip and having probes with identical sequences, the sequences differing between micro-locations;

positioning a solution containing the target molecules in electrical contact with the probes;

connecting a positive potential between the solution and the first electrically conductive contact strip and connecting a negative potential between the solution and the second electrically conductive contact strip;

selectively applying one of a positive or negative potential to one of the first and the second electrically conductive contact strips and the solution; and directing a beam of light through a portion of the photoconductive layer of material corresponding to one of the micro-locations to complete an electrical circuit between one of the first and the second electrically conductive contact strips and the solution through the portion of the photoconductive layer, whereby target molecules in the solution are attracted to or repelled from the probes of the micro-location corresponding to the portion, respectively, which is coupled into the electrical circuit by the beam of light.

10. A method as claimed in claim 9 wherein each probe includes an oligonucleotide sequence.

11. A method as claimed in claim 9 wherein each micro-location includes a surface area and the surface area includes an electrically conductive pad positioned on a coextensive portion of the photoconductive layer of material, overlying the first and the second electrically conductive contact strips.

12. A method as claimed in claim 9 wherein the step of providing the photoconductive layer of material includes providing a transparent substrate, depositing a transparent conductive material on the transparent substrate to form the first and the second transparent electrically conductive contact strips and depositing the photoconductive layer on the first and the second electrically conductive contact strips.

13. A method as claimed in claim 12 wherein the transparent conductive material includes indium tin oxide (ITO) or conductive-polymer.

14. A method as claimed in claim 12 wherein the step of directing the beam of light includes directing the beam of light through the transparent substrate and one of the first and the second electrically conductive contact strips.

15. A method as claimed in claim 14 wherein the step of directing the beam of light further includes providing a mask adjacent the transparent substrate.

16. A method as claimed in claim 1 wherein the photoconductive layer includes amorphous silicon, amorphous SiGe, amorphous SiC, CdS, CdSe, or photoconductive polymers.

17. Photoelectro-manipulation apparatus for the manipulation of target molecules comprising:

a photoconductive layer of material having a first electrically conductive contact strip and a second electrically conductive contact strip on a first surface thereof, formed of transparent conductive material;

a plurality of probes on an opposed second surface of the photoconductive layer, the plurality of probes being formed on a plurality of micro-locations, each micro-location overlying the first electrically conductive contact strip and the second electrically conductive contact strip and having probes with identical sequences, the sequences differing between micro-locations;

a positive electrical terminal coupled to the first electrically conductive contact strip; and a negative electrical terminal coupled to the second electrically conductive contact strip.

18. Apparatus as claimed in claim 17 further comprising a light source mounted adjacent the first electrically conductive contact strip and the second electrically conductive contact strip so as to direct light through one of the first electrically conductive contact strip and the second electrically conductive contact strip onto the photoconductive layer.

19. Apparatus as claimed in claim 17 further including a plurality of electrically conductive pads on the second surface of the photoconductive layer overlying the first and the second electrically conductive contact strips and each electrically conductive pad coextensive with a respective micro-location.

20. Apparatus as claimed in claim 17 wherein each probe includes an oligonucleotide sequence, protein, antibody, enzyme, or cell.

* * * * *